Patented Feb. 9, 1937

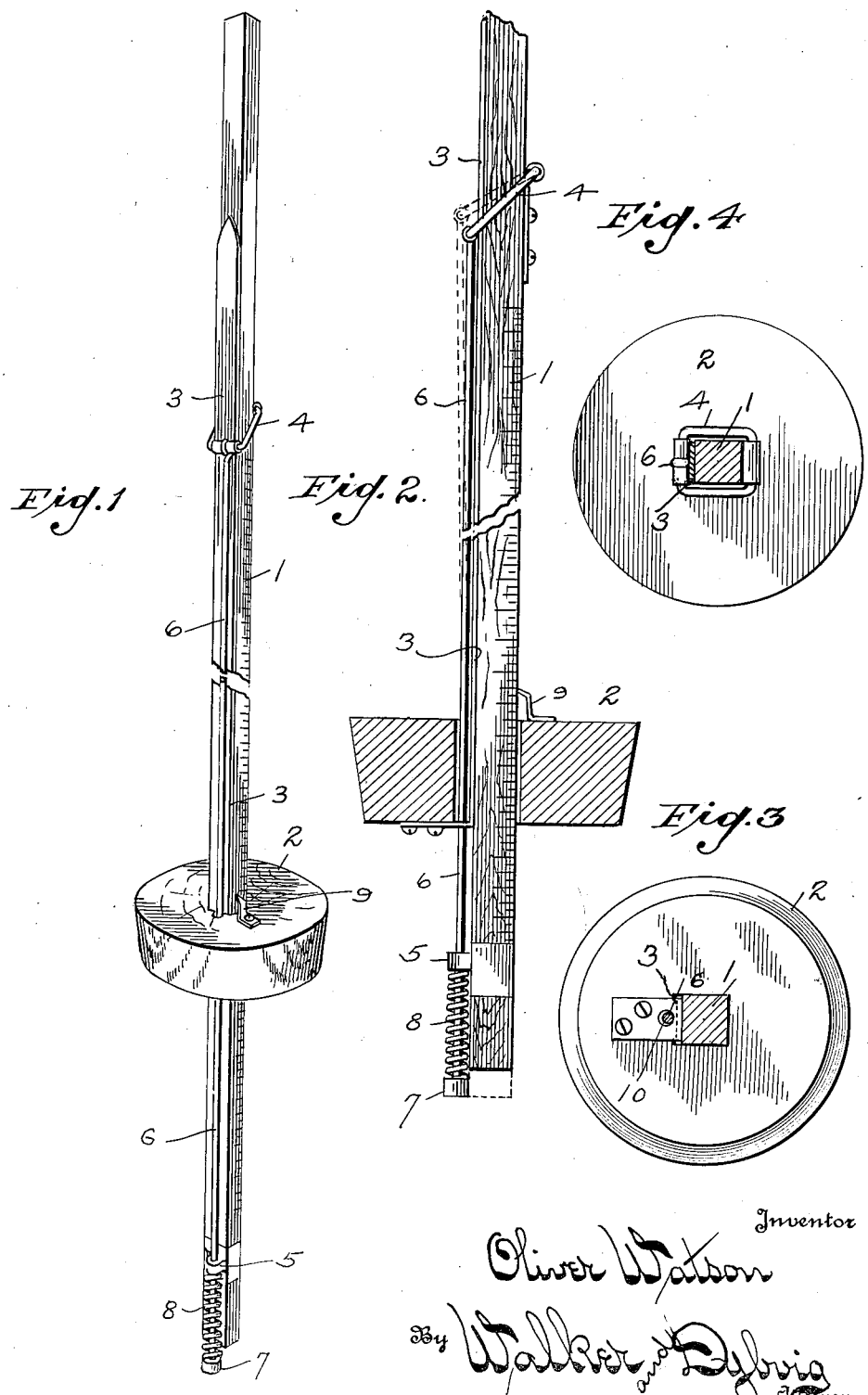

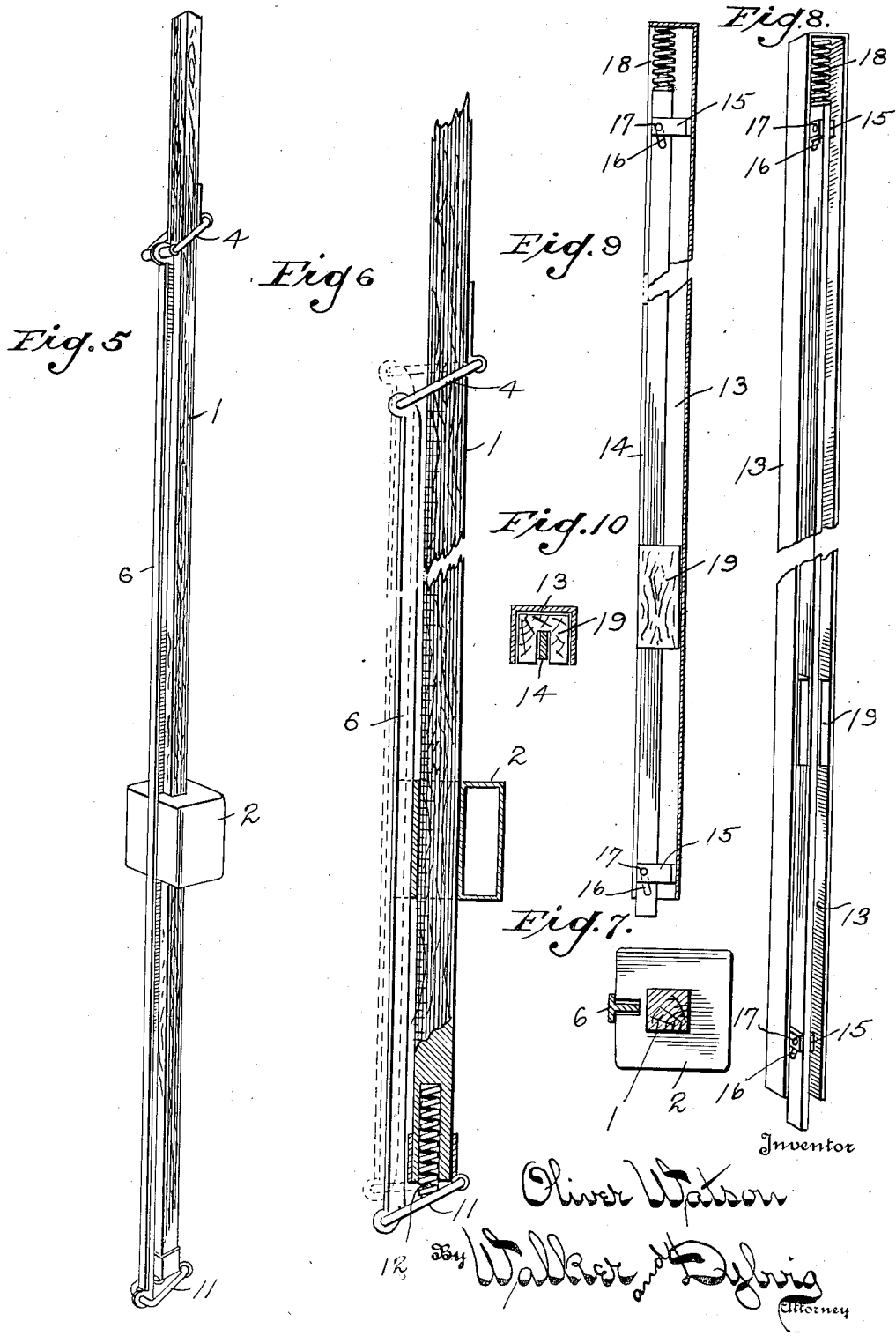

2,069,792

UNITED STATES PATENT OFFICE 2,069,792

ULLAGE ROD

Oliver Watson, Dayton, Ohio, assignor of one-half to Bert F. Downey, Springfield, Ohio Application December 6, 1934, Serial No. 756,214

18 Claims. (Cl. 73—120)

This invention relates to ullage rods for measuring the contents of tanks or containers, and more particularly to an automatic float operated indicating liquid gauge.

The present gauge is a portable device adapted to be thrust into tanks or containers for ascertaining the quantity of liquid contents thereof and is especially desirable for measuring the contents of underground gasoline tanks at filling stations, but is equally applicable in proper size for measuring the contents of casks, barrels, vats, sumps or wells for other liquids.

The device comprises a graduated gauge rod with which cooperates a float operated indicator adapted to be locked in its adjusted position relative to the rod and which is released by thrust pressure on the lower end of the gauge device. Upon release the indicator float rises to the liquid level, if below such level, or descends by gravity, if thereabove, and is again automatically locked in readjusted position by release of the thrust pressure on the rod.

The object of the invention is to improve the construction as well as the means and mode of operation of ullage rods and liquid gauges whereby they may not only be economically manufactured but will be more efficient in use, accurate and automatic in operation, sensitive and capable of affording quick indication and unlikely to get out of repair.

A further object of the invention is to provide automatic detent and release means for a float operated indicator.

A further object of the invention is to provide means for releasing the adjustable indicator by thrust pressure upon the gauge rod and to automatically lock the indicator in adjusted position by release of such pressure.

A further object of the invention is to provide a gauge device which will be of strong and sturdy construction, having but few parts and capable of withstanding hard usage to which such devices are subjected about filling stations and the like when not in use.

A further object of the invention is to provide a gauge device of light weight and compact form, capable of convenient operation, and possessing the desirable characteristics and advantageous features of construction herein mentioned.

With the above primary and other incidental objects in view, as will appear more fully in the specification, the invention consists of the features of construction, the parts and combinations thereof, and the mode of operation, or their equivalents, as hereinafter described and set forth in the claims.

Referring to the drawings wherein is shown the preferred, but not necessarily the only form of embodiment of the invention, Fig. 1 is a perspective view of the assembled gauge forming the subject matter hereof. Fig. 2 is a sectional view. Fig. 3 is a bottom plan view, and Fig. 4 a top plan view thereof. Fig. 5 is a perspective view and Fig. 6 a side elevation of the embodiment of the gauge adopted for commercial production. Fig. 7 is an end view thereof. Fig. 8 is a perspective view of a further modification. Fig. 9 is a longitudinal sectional view and Fig. 10 a transverse sectional view of the construction illustrated in Fig. 8.

Like parts are indicated by similar characters of reference throughout the several views.

A common method of measuring the contents of a tank is to thrust a graduated stick to the bottom of the body of liquid therein and note the portion which has been wet by contact with the liquid. However, when several tanks having different liquid levels are to be gauged in succession before the stick has time to dry, such method fails to indicate the quantity of contents of other than the tank having the highest liquid level. Moreover it is frequently desirable to retain the indication for a time after making the measurement. Hence in the present instance the ullage rod is provided with an automatic indicator, which is held in position until the next gauging operation.

Referring to the drawings, 1 is the ullage rod which may be of wood or other material and of any desired cross section form. The rod should be of sufficient length to extend somewhat above the top of the deepest tank to be gauged. Slidingly mounted on the rod 1 is a float 2 normally free for to and fro motion. Attached to the float 2 and extending thereabove in close parallel relation with the rod 1 is a strip 3 which reciprocates relative to the rod with the rise and fall of the float. Pivoted to the rod 1 adjacent to the top thereof but within the limit of the strip 3 when the float is at the lower limit of its range of movement is a swinging clamp member 4. In the present disclosure this clamp comprises a link surrounding the rod and strip and impinges upon the latter when assuming an extreme angular position relative to the axis of the rod. Connected with the clamp member 4 and extending through a lateral enlargement of the central rod hole in the float and thence through a guide 5 at the lower end of the rod 1, is a thrust rod 6, having a foot or contact portion 7 projecting slightly beyond the end of the rod 1. Surrounding the thrust rod 6 and abutting at its upper end against the rod guide 5 is a helical retracting spring 8, which tends to draw the clamping member downwardly into clamping engagement with the float carried strip 3, thereby holding the float in adjusted position.

Upon inserting the gauge in upright position in a container and pressing the gauge rod downwardly until its lower end contacts the bottom of the container, the thrust rod 6 is forced upwardly against the tension of the spring 8 by contact of its foot 7 with the bottom of the container. This relative thrust adjustment of the gauge rod 1 and thrust rod 6 lifts the swinging clamp member 4 to release the float carried strip 3. The float is then free to rise if below the liquid level of the contents of the tank, or to descend if thereabove, until the float rests upon the body of liquid being measured. Upon lifting the gauge rod the spring immediately returns the thrust rod to projecting relation and draws the clamp 4 again into engagement with the float strip to lock the float in its adjusted position. A pointer 9 upon the float cooperates with a series of graduations upon the gauge rod 1 to indicate either the depth or volume of the body of liquid.

The lower end of the float strip 3 extends through the central opening in the float beside the gauge rod and is extended laterally beneath the float to which it is secured. The strip has therein a hole 10 through which the thrust rod extends and which affords a suitable sliding bearing therefor. If desired the pointer or indicator may be omitted and the relation of the surface of the float to the graduations on the rod may serve to indicate the measurement.

In Figs. 5 to 7 there is illustrated a simplified construction of the gauge device wherein the float strip 3 has been omitted and the push rod, which is connected to the gauge rod by swinging links at each end for parallel movement, is utilized as a clamping member directly engageable with the float.

In this embodiment of the invention, the float 2 which may be of any desired shape or construction is shown as of substantially cubical form and of hollow metallic construction. The float is mounted on the gauge rod 1 for reciprocatory motion as before described. It is shown provided with a lateral groove to receive the thrust rod 6. This construction may be employed in lieu of passing the rod through a hole in the float, as in Figs. 1 to 4 which may be done conveniently only in the event the float is of greater size.

The thrust rod 6 in the present instance is also the locking member and is yieldingly connected with the gauge rod at each end by swinging links, whereby it is capable of a parellel swinging motion. To stiffen the rod it is preferably although not necessarily made of a substantially T-shaped cross sectional form. At its upper end it is connected to the gauge rod 1 by the link 4 which as before described, has pivotal connection with both the gauge rod 1 and the thrust rod 6. At its lower end it is similarly connected with the gauge rod by a swinging foot plate 11 hinged to both the gauge rod and thrust rod and having substantially the same radius as the link 4. The thrust movement by which the float is released is effected against the yielding resistance of the spring 8 which in the present embodiment is seated in a bore or socket in the lower end of the gauge rod 1 and bears against the foot plate 11, which is provided with a projecting stud 12 over which the spring engages. The reaction of the spring tends to draw the thrust rod 6 downwardly and inwardly against the bottom of the groove or recess to clamp the float in its adjusted position upon the gauge rod 1. The operation of the modified form of device is the same as before described, that is, by a downward thrust pressure upon the gauge rod against the bottom of a tank the foot plate 11 and with it the thrust rod 6 and upper link 4 are swung upwardly and outwardly thereby releasing the float 2 from the lateral clamping pressure of the rod 6. Upon being released the float seeks the liquid level of the contents of the tank, descending by gravity if thereabove, or ascending if below such level, and upon release of the thrust pressure upon the gauge rod, the clamp rod 6 is moved inwardly under the retractive influence of the spring 8 to again clamp the float in its adjusted position.

Under some conditions, especially when the opening into the tank or container is relatively small, the forms of device before described may be found objectionable due to the tendency of the float to catch upon the margin of the tank opening in inserting or removing the gauge. For such use there is shown in Figs. 8 to 10 a further modification wherein there are no projecting portions and the gauge presents continuous straight unbroken surfaces.

In such construction there is employed an elongated channel 13 preferably of sheet material, in lieu of the wooden gauge rod 1 before referred to. Longitudinally disposed within the channel 13 for limited reciprocatory motion relative thereto, is a reciprocatory rod 14 mounted in suitable brackets 15 secured interiorly of the channel beyond one end of which the rod 14 projects. The rod 14 is provided with short inclined slots 16 coincident with the brackets 15 through which extend pins 17 on which the rod rides within the limit of the slots 16. A spring 18 is interposed between one end of the rod 14 and one end of the channel 13 against the yielding resistance of which the rod 14 is longitudinally movable under influence of thrust pressure. Upon such longitudinal movement against the tension of the spring 18, the inclined slots exerting a camming action will cause the rod 14 to simultaneously move laterally away from the channel 13 while, however, maintaining parallel relation therewith.

Enclosed within the channel member 13 and extending about the rod 14 intermediate such rod and the walls of the channel is a buoyant float member 19. The float member is normally clamped between the bar 14 and the back wall of the channel 13 by the approach of the rod 14 under influence of the spring 18. Upon thrust pressure being applied to the protruding end of the rod 14 the resulting combined longitudinal and lateral shifting movement of the rod releases the float 19 and permits it to assume its position coincident with the liquid level of the contents of the tank. Upon release of pressure the bar reengages and clamps the float in its adjusted position under influence of the spring 18.

While the normal and intended method of operation in each instance is to thrust the end of the yielding push rod against the bottom of the tank by pressure applied to the upper end of the gauge member, it is to be noted that the device may, if desired, be inverted and the graduations correspondingly arranged, in which event the end of the gauge member may be stationarily thrust against the bottom of the tank and the float released by pressure applied to the end of the yielding push rod which in such position would project upwardly and be manually depressible relative to the gauge member.

From the above description it will be apparent that there is thus provided a device of the character described possessing the particular features of advantage before enumerated as desirable, but which obviously is susceptible of modification in the form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In a liquid gauge, a gauge rod, a float mounted for sliding movement thereon, a strip carried by the float and movable therewith in close parallel relation with the gauge rod, a clamp carried by the gauge rod and engageable with the strip to clamp the latter in its adjusted position relative to the rod, a push rod operatively connected with the clamp and mounted for longitudinal adjustment relative to the gauge rod extending beyond the lower end of the gauge rod and engageable with the bottom of a container in advance of the gauge rod and subject to longitudinal movement under thrust pressure upon the gauge rod to effect disengagement of the clamp, and a spring against the tension of which the push rod is movable and adapted to return the clamp to engagement with the strip upon release of thrust pressure upon the gauge rod.

2. In a gauge rod of the class described, a graduated gauge rod, a float slidingly engaging the gauge rod for movement longitudinally thereof, spring actuated locking means for said float independently of which the float is guided by the gauge rod, the locking means being movable laterally independently of the float and gauge rod and relative thereto into and out of engaging relation with the float, and operable by thrust effort upon said rod to release the float, and an indicator movable in unison with the float cooperating with graduations upon the rod to indicate a measured quantity.

3. In a liquid gauge, a gauge rod, a float carried thereby for relative longitudinal movement, means movable laterally independently of the float and relative thereto for locking the float in adjusted position relative to the rod, including a yielding foot carried by the rod adapted upon thrust pressure upon the rod to release the float for movement into floating relation with a body of liquid being measured, said lock being operative upon release of such thrust pressure to secure the float in its readjusted position.

4. In a liquid gauge, a gauge rod, a float carried thereby, locking means for securing the float in adjusted relation with the rod including a reciprocatory push rod movable laterally independently of the float into and out of operative position controlling said lock and operative under pressure thereon to release the float, said lock being re-engageable therewith upon release of the push rod.

5. In a liquid gauge, a gauge rod, a float movable longitudinally thereof, a yieldingly mounted clamping member movable laterally relative to and independently of the float extending beyond the lower end of the gauge rod for securing the float to the rod in its adjusted relation and engageable with the bottom of a vessel in advance of the gauge rod, said clamping member yielding under thrust pressure exerted upon the gauge rod to release the float whereby the float may assume a position coincident with the liquid level of the body of liquid being measured, the clamping member being automatically operative to reclamp the float upon release of such thrust pressure.

6. In a liquid gauge, a gauge rod, a float mounted for movement longitudinally thereof, a locking member carried by the rod for securing the float in adjusted position relative to the rod, and movable laterally into and out of locking engagement independently of the float, and releasable by thrust pressure upon the gauge rod whereby the float may assume a position coincident with the liquid level of the body of liquid being measured, said locking member being automatically operative to secure the float upon release of such thrust pressure.

7. In a liquid gauge, a gauge rod, a float movable longitudinally thereof, means carried by the rod for locking the float in adjusted relation with the gauge rod capable of lateral movement independently of the float extending beyond the end of the gauge rod and adapted upon longitudinal movement thereof to effect release of the float for movement relative to the rod whereby the float may assume a position coincident with the liquid level of the body of liquid being measured, said locking means being operative to secure the float in its adjusted position upon return movement of the locking means.

8. In a liquid gauge, a gauge rod, a float having an opening therein through which the gauge rod extends, the float being movable longitudinally thereof, means carried by the gauge rod for locking the float in adjusted relation with the gauge rod, independently of which the float is guided, extending beyond the end of the gauge rod and operative to release the float upon relative movement of the locking means and gauge rod, whereby the float may assume a position coincident with the liquid level of the body of liquid being measured and a spring automatically actuating the locking means to secure the float in its adjusted position upon return relative movement of the respective parts.

9. In a gauge of the class described, a gauge rod, a float mounted for longitudinal movement relative thereto, locking means independently of which the float is mounted for movement relative to the gauge rod for securing the float in adjusted position and operative by thrust pressure upon the gauge rod to permit the float to assume a position coincident with the liquid level of a body of liquid being measured, said lock being automatically operative to lock the float in its readjusted position upon release of thrust pressure upon the gauge rod, an indicator movable with the float and a series of graduations upon the gauge rod with which the indicator cooperates to indicate the measured quantity of liquid being gauged.

10. In a liquid gauge, a gauge rod, a float movable longitudinally thereof, a locking rod independently of which the float is mounted for movement relative to the gauge rod extending in parallel relation with the gauge rod, there being a portion upon the float clamped intermediate the gauge rod and said locking rod, and means operable by thrust pressure upon the gauge rod for effecting movement of the locking rod laterally relative to the float and independently thereof to release the float and to again clamp the float upon release of such thrust pressure.

11. In a liquid gauge, a gauge rod, a float movable longitudinally thereof, a locking rod extending in parallel relation with the gauge rod and movable laterally relative to the float and independently thereof into and out of locking relation with the float, and means operated by thrust pressure upon the gauge rod for effecting relative movement of the locking rod.

12. In a liquid gauge, a gauge rod, a float movable longitudinally thereof, detent means adjustably mounted upon the gauge rod and movable laterally relative to the float and independently thereof into and out of engaging relation for temporarily holding the float in its adjusted position relative to the gauge rod, said detent being engaged and disengaged by variation of longitudinal thrust pressure upon the gauge rod.

13. In a liquid gauge, a gauge rod, a float movable longitudinally thereof, detent means movable laterally relative to the float and independently thereof into and out of engaging relation for temporarily holding the float in its adjusted position relative to the gauge rod, and including a yielding contact position projecting beyond the lower end of the gauge rod and engageable with the bottom of a tank for releasing the detent by its yielding movement under influence of thrust pressure upon the gauge rod.

14. In a gauge member, a channel shaped member, a rod extending longitudinally therethrough, cam slots in the rod, guides carried by the channel shaped member engaging in the slots, said rod being diagonally movable relative to the channel in a direction determined by said slots, a float member enclosed within the channel and clamped therein by the movable rod, and a spring tending to move the rod into clamping engagement with the float.

15. In a gauge of the character described, a gauge rod and a clamping rod interconnected for relative longitudinal movement of one member relative to the other, a float guided on the gauge rod wholly independently of the clamping rod, a spring against the yielding resistance of which such longitudinal motion is effected, guiding means for deflecting the clamping rod laterally away from the float simultaneously with its longitudinal movement against the tension of the spring, the float member being slidable upon the gauge rod and exteriorly engageable by the clamping rod upon their approach one toward the other under influence of said spring.

16. In a gauge of the character described, a pair of parallel members interconnected for relative longitudinal movement of one member relative to the other, a spring against the yielding resistance of which such longitudinal motion is effected, inclined guide ways upon one of the members and means carried by the other member engaging the inclined guide ways for deflecting the movable member laterally away from the companion member simultaneously with its longitudinal movement against the tension of the spring, and a float member slidable upon one of the parallel members and clamped therebetween upon their approach one toward the other under influence of said spring.

17. In a gauge of the character described, a gauge rod and a laterally movable clamp rod interconnected for relative longitudinal movement of one member relative to the other, a spring against the yielding resistance of which such longitudinal motion is effected, swinging links interconnecting the members one to the other and guiding the clamp rod laterally away from the gauge rod simultaneously with its longitudinal movement against the tension of the spring, and a float member slidable upon the gauge rod independently of the clamp rod and clamped therebetween upon their approach one toward the other under influence of said spring.

18. In a gauge device, a channel shaped member, a rod extending in parallel relation thereto, cam slots in one of said members, guides carried by the other of said members and engaging in the cam slots, said members being relatively movable one towards and from the other in directions determined by said cam slots, a float member enclosed within and guided by the channel shaped member independently of the rod and clamped therein by the relative movement of said members one toward the other, a spring normally tending to move said members one toward the other into clamping engagement with the float and against the yielding resistance of which the said members are relatively movable to release the float from clamping engagement therebetween.

OLIVER WATSON.